United States Patent [19]
Jones et al.

[11] 3,985,704
[45] Oct. 12, 1976

[54] METHACRYLATE-BUTADIENE-STYRENE GRAFT POLYMERS AND PROCESS FOR THEIR PRODUCTION

[75] Inventors: Donald H. Jones, Vincentown, N.J.; William J. Ferry, Fairless Hills, Pa.

[73] Assignee: Rohm and Haas Company, Philadelphia, Pa.

[22] Filed: June 19, 1975

[21] Appl. No.: 588,544

[52] U.S. Cl. .......................... 260/42.32; 260/42.37; 260/42.47; 260/42.55; 260/42.56; 260/879; 260/880 R
[51] Int. Cl.$^2$ .................... C08J 3/20; C08K 3/04; C08K 3/26; C08K 3/36
[58] Field of Search .......... 260/880 R, 42.32, 42.37, 260/42.47, 42.55, 42.56, 879

[56] References Cited
UNITED STATES PATENTS

| | | | |
|---|---|---|---|
| 3,288,886 | 11/1966 | Himei et al. | 260/876 R |
| 3,644,250 | 2/1972 | Ide et al. | 260/876 R |
| 3,842,144 | 10/1974 | Tanaka et al. | 260/880 R |

FOREIGN PATENTS OR APPLICATIONS

| | | |
|---|---|---|
| 657,772 | 9/1951 | United Kingdom |
| 723,315 | 2/1955 | United Kingdom |
| 901,167 | 7/1962 | United Kingdom |

OTHER PUBLICATIONS

Penn–PVC Technology (3rd Ed.), (Wiley), (N.Y.), (1971), pp. 161–163.
Cab-O-Sil-Technical Bulletin, C-10 (Cabot Corp.), (Boston), (1969), pp. 3, 28–29, & 51–52.

*Primary Examiner*—Lewis T. Jacobs
*Assistant Examiner*—H. H. Fletcher
*Attorney, Agent, or Firm*—Michael B. Fein

[57] ABSTRACT

Multi-stage impact modifier having a high rubber content prepared by a process which includes isolation by spray drying in the presence of fumed silica or another inert particulate material in the gaseous drying medium.

8 Claims, No Drawings

METHACRYLATE-BUTADIENE-STYRENE GRAFT POLYMERS AND PROCESS FOR THEIR PRODUCTION

CROSS REFERENCE TO RELATED APPLICATION

This application is related to Ser. No. 589,972 filed June 24, 1975 of William J. Ferry, Donald H. Jones and Roger K. Graham entitled Process for Manufacture of Acrylic Core/Shell Polymers.

BACKGROUND OF THE INVENTION

This invention relates to novel MBS impact modifiers, especially for PVC, and a process for preparation of the modifier.

Prior MBS impact modifiers are known, but whereas high rubber levels were always desired, achievement of such levels usually required isolation by coagulation procedures. While the advantages of spray drying as an isolation technique are well known, no one previously used spray drying methods for high butadiene content MBS modifiers because of problems which would be associated with the spray drying process with such polymers. Even with coagulation technique, greater than 70% rubber content was not thought achieveable. See French Pat. Nos. 1,457,829; 1,391,111; U.K. Pat. Nos. 1,039,802; 1,344,891; and U.S. Pat Nos. 3,288,886; 3,775,514; 3,644,250; 3,644,249; 3,671,610. The latter discloses up to 75% rubber content, but does not exemplify such high rubber levels. It was unexpected that higher rubber levels than were achieved with coagulation techniques could be achieved by spray dry techniques.

It is an object of the present invention to produce high, especially greater than 70% by weight, rubber content MBS graft polymers as improved impact modifiers.

This object, and others as will become apparent from the following disclosure, are achieved by the present invention which comprises in one aspect a process for producing a multiple stage, sequentially produced, impact modifier having a high rubber content comprising graft polymerizing methyl methacrylate and styrene in any order or proportion onto a polymerized butadiene or butadiene-styrene rubber polymer so as to form a latex of a two or more stage graft polymer, spray drying the resultant graft polymer latex while blowing fumed silica or another inert particulate material into the gaseous spray drying medium in the spray dryer, the rubber content of the resultant graft polymer being at least about 70% by weight, and in another aspect the product produced by this process.

The MBS polymer is dried from a latex which is polymerized sequentially so as to produce a graft polymer, the first stage being a rubbery polymer of butadiene, either alone or with one or more ethylenically unsaturated monomers such as methacrylates, acrylate, or styrene, the latter being most preferred. Optionally, one or more polyunsaturated cross-linking monomers are present in addition to butadiene.

The first stage, or "rubber" stage, i.e. the butadiene-containing stage, is preferably at least about 70% and more preferably at least about 75% with the balance being at least one subsequent stage.

The preferred fumed silica is produced by vapor phase hydrolysis of silicon tetrachloride at high temperatures, usually around 1100° C., and is an amorphous material having a small particle size (about 0.007 to 0.05 microns) and a large surface area (about 50 to 390 $m^2 \cdot g^{-1}$). Silicas of this nature are wettable but can be made hydrophobic by silanization. Both forms are useful in the process of the invention.

Possibly other inert particulate material than fumed silica could be useful in the invention, especially if the inert particulate material has a particle size of about 0.007 to 1.5 microns and a surface area of about 1 to 400 $m^2 \cdot g^{-1}$; for example, aluminum silicate, calcium carbonate, carbon black, titanium dioxide, polymethyl methacrylate, zinc oxide, and infusorial earth.

The following Examples are presented to illustrate a few embodiments of the invention, but are not intended to be limiting.

EXAMPLE I

A. Preparation of rubbery polymer latex

A stainless steel autoclave with an agitator and several entry ports is charged with 5 parts of a diphenyl oxide sulfonate emulsifier in 2688 parts of de-ionized water and 4.9 parts of sodium formaldehyde sulfoxylate and brought to pH=4. The autoclave is evacuated and 2297 parts of butadiene, 96.8 parts of styrene, 12 parts of cumene hydroperoxide, and 24.6 parts of divinylbenzene are added and caused to react at 70° C. over 9 hours. An additional 36.9 parts of emulsifier is also added. At the end of the reaction period no further pressure drop is observed, the residual pressure is vented and the latex is strained to remove gum.

B. Preparation of the graft polymer

To 500 parts of latex prepared in the preceding paragraph is added 34 parts of styrene followed by 0.068 parts of sodium formaldehyde sulfoxylate dissolved in 52 parts of de-ionized water and 0.136 parts cumene hydroperoxide. One hour after completion of the exotherm 35 parts of methyl methacrylate, 0.352 parts of butylene dimethacrylate, 0.035 parts sodium formaldehyde sulfoxylate dissolved in 10 parts deionized water and 0.070 parts of cumene hydroperoxide are added and caused to react to completion.

C. Isolation of the graft polymer

The resultant polymer latex has a butadiene/styrene rubber content of 77.5% by weight, with an overall butadiene content of 73.6%.

Isolation of the latex as prepared in A and B, supra, in a spray dryer by atomization in the presence of air as the drying medium with varying levels of fumed silica added by suspending in the gaseous drying medium demonstrates the advantages of the invention.

Compressibility and cohesion, which should be as low as possible for desirable impact modifier flow properties, are reported in Table I.

TABLE I

| | Power Flow Parameter | |
|---|---|---|
| % Fumed Silica | Compressibility | Cohesion |
| None | 42 | 82 |
| 0.1 (Wettable) | 35 | 32 |
| 0.2 (Wettable) | 22 | 25 |
| 0.5 (Wettable) | 16 | 6 |
| 0.2 (Hydrophobic) | 21 | 12 |
| 0.5 (Hydrophobic) | 12 | 0 |

Cohesion and compressibility are measured as described in Chemical Engineering, Jan. 19, 1965.

EXAMPLE II

MBS graft polymers prepared and isolated in accordance with Example I are incorporated as impact modifiers in PVC in accordance with the following formulation and are found to exhibit good impact strength and efficiency as well as good clarity.

A.
| | |
|---|---|
| PVC Resin (K=55) | 100 |
| Processing aid, MMA/EA (90/10) | 2.5 |
| Butyl tin stabilizer | 2.0 |
| Lubricant A (Aldo MS) | 0.75 |
| Lubricant B (OP Wax) | 0.75 |
| Modifier | Variable |

B. The impact strength of the resulting formulations are reported in Table II.

The closest prior art known to applicants at the time of filing this application are U.K. Pat. No. 657,772 which shows a chemical reaction between two liquid streams in a spray dryer; U.K. Pat. No. 723,315 which shows addition of silica and other materials in a spray dryer during isolation of natural rubber latex, but requires pH adjustment to change the isoelectric point (such a technique is not used or necessary in the present invention); and U.K. Pat. No. 901,167 which is similar to U.K. Pat. No. 723,315; none teach isolation of MBS graft polymers.

The modifier of the invention has utility as a very efficient impact modifier for PVC, especially in non-clear blends, but also in clear formulations, and can comprise from about 1 to 30 percent by weight of the blend; usually, however, about 2 to 15% by weight would be used.

TABLE II

Izod Impact Strength, kg-cm/cm notch at varying temperatures

| % Modifier | | 6 | 7 | 8 | 10 | 12 | 15 | 20 |
|---|---|---|---|---|---|---|---|---|
| Temp. | Level of Silica | | | | | | | |
| 23° C. | 0.1 | 13 | 22* | 54* | 70 | 82 | | |
| | 0.2 | 12 | 23* | 35* | 59 | 84 | | |
| | 0.5 | 11 | 14* | 29* | 84 | 87 | | |
| | 0.5+ | 12 | 14 | 42* | 73 | 82 | | |
| 0° C. | 0.1 | | | | 7.1 | 30* | 88 | 107 |
| | 0.2 | | | | 9.8 | 29* | 88 | 104 |
| | 0.5 | | | | 13 | 28* | 72 | 96 |
| | 0.5+ | | | | 13 | 39* | 89 | 109 |
| −18° C. | 0.1 | | | | | 12 | 41* | 87 |
| | 0.2 | | | | | 13 | 36* | 87 |
| | 0.5 | | | | | 10 | 23* | 88 |
| | 0.5+ | | | | | 13 | 53* | 85 |

+Hydrophobic fumed silica; others wettable silica.
*Values indicate both clear and hinged breaks were observed in the testing.

We claim:

1. A process for producing a multiple stage, sequentially produced, impact modifier having a high butadiene content comprising graft polymerizing methyl methacrylate and styrene in any order onto a polymerized butadiene or butadiene-styrene polymer so as to form a latex of a two or more stage polymer, spray drying the resultant graft polymer latex while blowing 0.01 to 5% by weight inert particulate material into the gaseous spray drying medium in the spray dryer, the rubber content of the resultant graft polymer being at least about 70% by weight.

2. The process of claim 1 wherein the rubber content of the graft polymer is above 75%.

3. The process of claim 1 wherein the inert particulate material is fumed silica.

4. The process of claim 1 wherein the inert particulate material is selected from the group consisting of aluminum silicate, calcium carbonate, carbon black, titanium dioxide, polymethyl methacrylate, zinc oxide, and infusorial earth.

5. The process of claim 1 wherein 0.01 to 5% fumed silica based on weight of dry graft polymer is introduced into the drying chamber as a solid suspended in the gaseous drying medium.

6. The process of claim 5 wherein the butadiene rubber stage further includes polyethylenically unsaturated cross-linking monomer.

7. The product produced by the process of claim 1.

8. Polyvinyl chloride impact-modified with about 1 to 30% by weight of the product of claim 7.